3,778,502
METHOD FOR COMBATTING SCALING
OF THE SCALP
Guy Aubin, Gentilly, and Georges Manoussos, Paris,
France, assignors to Societe Anonyme dite: L'Oreal,
Paris, France
No Drawing. Continuation-in-part of abandoned application Ser. No. 748,185, July 29, 1968. This application Feb. 2, 1971, Ser. No. 112,092
Claims priority, application Luxembourg, Aug. 1, 1967, 54,253
Int. Cl. A61k 27/00, 15/12
U.S. Cl. 424—266                                  14 Claims

ABSTRACT OF THE DISCLOSURE

A method for combatting scaling of the scalp which comprises applying to the hair and scalp a composition comprising a solution of, as an active ingredient, arginine, histidine and lysine as well as the citric, nicotinic and malic acid salts thereof, including mixtures thereof in a solvent such as water, a lower alkanol and an aqueous solution of a lower alkanol. The active ingredient is present in amounts ranging from 0.2–5 weight percent of the composition which has a pH ranging from about 7.0 to about 11.

---

This application is a continuation-in-part of our earlier application Ser. No. 748,185, filed July 29, 1968, now abandoned.

This invention relates to a method for combatting scaling of the scalp which comprises applying to the hair and scalp a composition comprising a solution of arginine, histidine and lysine as well as the critic, nicotinic and malic acid salts thereof, including mixtures thereof as the active ingredient, in a solvent such as water, a lower alkanol having 1–4 carbon atoms, particularly ethanol and isopropanol, and an aqueous solution of said lower alkanol, the active ingredient being present in amounts of about 0.2 to about 5 weight percent of the composition which has a pH of about 7.0 to about 11.

It is well known that in many cases, for reasons which are not well understood, but which probably include both metabolic disturbances and external factors, the scalp peels off in particles forming small scales. While this phenomenon cannot, in general, be considered pathological, it is nevertheless unpleasant because of the unattractive appearance which it imparts to the hair.

It has already been proposed to combat the formation of these scales by various hair preparations, and particularly quaternary ammonium derivatives, contained in lotions or in shampoos. It has also been known to use certain protein derivatives such as human placenta extracts (Filatov type) in cosmetic preparations. The chromatogram of this extract reveals before hydrolysis: aspartic acid, glutamic acid, serine, glycocoll, alanine, diamino acids, proline, methionine, valine, leucine, isoleucine, phenylalanine and tyrosine and after hydrolysis: cysteic acid, aspartic acid, glutamic acid, serine, glycocoll, alanine, glutamine, diamino acids, proline, oxyproline, tyrosine, methionine, valine, leucine, isoleucine, phenylalanine, threonine and tryptophane. A known antidandruff lotion containing this extract is composed of 0.5 g. quaternary ammonium chloride, 0.5 g. antiseptic of sodium thymolsulfonate type; 0.5 g. perfume, 5.0 g. nonionic wetting agent and solubilized perfume, 10.0 Vegetol L (aqueous type) SEPA; 20 g. human placenta extract (Filatov type) and QS 100 g. double distilled water containing 0.1% Nipasept.

In addition to the use of human placenta extracts in certain cosmetic preparations, the art has also recognized the use of lyophilized embroy extracts, embryo extracts (Filatov type), conjunctive tissue extracts (Filatov type), amniotic liquid, bovine albumin serum, lactalbumin (30%), non-specific bovine serum, lactamin powder and glycero-glycolic lactamin, calfskin collogen and monocellular organisms (proteins like yeast) as ingredients in certain cosmetic preparations. Representative of the latter is Vegetol L, the chromatography of which on paper reveals the following amino acids: aspartic, glutamic, serine, glycocoll, threonine, glutamine, alanine, diamino acids, methionine, tyrosine, valine, leucine and phenylalanine.

A known anti-seborrheic lotion utilizing Vegetol L for 100 g. of finished product contains 2 g. polyoxyethylene castor oil, 2 g. polyoxyethylene alkyl phenol, 2 g. non-aldehydic perfume, 0.5 g. sodium sulfosuccinate derivative, 0.5 g. color solution, 0.1 g. preservative like salicylic acid, 81.9 g. double distilled water, 5 g. Vegetol L and 5 g. human placenta extract (Filatov type).

Still other known protein derivatives used in cosmetic preparations include what the art recognizes as protein detergents. These are complex amides resulting from the condensation of a fatty acid and a polypeptide joined together at the amino group of the polypeptide. Commercially, these protein detergents are available under the trade name "Maypon." A reported analysis of the amino acid content of a Maypon polypeptide reveals it contains glutamic acid (10.3%), lysin (4.2%), leucines (4.9%), aspartic acid (6.3%), proline (14.3%), serine (3.1%), phenylalanine (2.7%), threonine (2.2%), valine (2.6%), alanine (9.6%), glycine (25.6%), and arginine (trace).

In this regard, a protein detergent characterized as the condensation product of undecylenic acid and a polypeptide complex has been used in the treatment and prevention of dandruff.

Notwithstanding the use of such protein derivatives in cosmetic preparations, the applicants have surprisingly found that a scalp characterized by scaling can be effectively treated to reduce substantially or to essentially eliminate such scaling by applying thereto a composition comprising a solution of a member selected from the group consisting of arginine, histidine, lysine, the citric, nicotinic and malic acid salts thereof as well as mixtures of the aforesaid active ingredients in a solvent therefor, said solvent being selected from the group consisting of water, a lower alkanol and mixtures thereof. The above-listed active ingredients are present in amounts ranging from about 0.2 to about 5 weight percent of the composition which has a pH of about 7–11. The applicants have also found that the process of the present invention utilizing as it does the aforementioned composition provides significantly better results in terms of combatting scaling of the scalp including a significant reduction of scale recurrence thereon than the use of known protein derivatives including the aforementioned protein detergents.

Thus the present invention relates to a method for combatting such scaling by applying to the scalp a composition which is capable of very effectively combatting such scaling, with long-lasting effects, and which facilitates the nutrition and biological equilibrium of the scalp.

It is an object of the present invention to provide a method to combat scaling of the scalp which comprises applying to the hair and scalp a composition comprising a solution of, as an active ingredient, a member selected from the group consisting of arginine, histidine, lysine, the citric, nicotinic and malic acid salts thereof and mixtures thereof.

In accordance with the invention, arginine, histidine or lysine can be used in their dextrorotary, levorotary of racemic forms.

Further, the composition used in the method of this invention has a pH ranging from about 7.0 to about 11 and the said active ingredient is present in amounts of about 0.2 to about 5 weight percent of the composition, preferably about 1–4 weight percent.

In a preferred embodiment of pH value of the compositions used in accordance with this invention can be adjusted to the values given by addition of the composition of an acid selected from the group consisting of citric, malic, nicotinic, tartaric and aspartic acid, the amount of the acid added being sufficient to impart to the composition a pH fully within the recited range, and obviously being dependent on such easily recognizable factors as the choice and amount of active ingredient.

The cosmetic products used in accordance with the present invention can also contain other known adjuvants, including for instance bactericidal agents, penetrating agents, perfumes, dyes, brilliantines and the like and can be provided in the form of aqueous or aqueous lower alkanol lotion, cream, gel, or aerosol and can further include conventional detergents. When provided in the form of a lotion, the active ingredient is generally present in amounts of about 1% by weight of said composition and when provided in the form of a shampoo composition, the active ingredient is present in amounts of about 4 weight percent.

However, the composition employed in the present invention when in the form of a simple aqueous or an aqueous alcoholic solution, effectively removes dirt from the scalp while it simultaneously combats scaling of the scalp.

In accordance with the present process there is applied to the scalp of the person being treated about 5 to 20 cc. of the above described composition daily for about a week. Thereafter, if desirable, the frequency of the treatment can be reduced to once every two or three days or even replaced by application of a hair lotion to the hair and scalp, the hair lotion containing said composition or even by shampooing the scalp weekly with a detergent-containing solution of said composition.

The beneficial effects produced by the practice of the present invention can be observed essentially as long as the treatment described above is employed with reasonable regularity.

The following examples illustrate the present invention.

EXAMPLE 1

A composition for use in accordance with the present invention is prepared by introducing 1 g. of L-arginine into 100 ml. of distilled water to which a trace of perfume and coloring material has been added.

This composition which has a pH of 10.7 is applied to the scalp daily and carefully massaged in until the resulting foam disappears.

EXAMPLE 2

A composition for use in accordance with the present invention is produced by preparing the following mixture:

| | |
|---|---|
| L-arginine _____ g__ | 1 |
| Extract of lyophilized amniotic liquid obtained as described in French Patent No. 1,440,616 of Aug. 18, 1964 _____ g__ | 1 |
| Sodium merthiolate _____ g__ | 0.002 |
| Hexylene glycol _____ | 0.6 |
| Perfume _____ ml__ | 0.3 |
| 20% aqueous ethanol solution (q.s.p.) ____ml__ | 100 |
| pH—9.5. | |

The amniotic liquid is obtained, according to French Patent No. 1,440,616, by removing the same from a cow at a stage of pregnancy which is less than 100 days and preferably about 75 days. Immediately after its removal, the amniotic liquid is freed of solid particles and sterilized under pressure. The purified and sterilized amniotic liquid is then lyophilized and at the time of use is added to sterile water to provide a concentration of about 10–100 mg./cc. of solution.

The resulting composition is applied to the scalp daily and its use demonstrated an effective diminution of scale formation.

EXAMPLE 3

In order to combat scaling of the scalp, the hair is washed each week with an aqueous solution including 2.5 weight percent arginine.

This solution is applied to the scalp and massaged in to produce an abundant foam. This is left in contact with the scalp for about 1 minute, and rinsed copiously. A lotion having the following composition is then applied daily:

| | |
|---|---|
| L-arginine _____ g__ | 1 |
| Ethyl ricinoleate _____ g__ | 0.2 |
| Glycerine _____ g__ | 0.5 |
| Hexylene glycol _____ g__ | 0.6 |
| Perfume _____ ml__ | 0.3 |
| 50% aqueous solution of ethanol (q.s.p.) ____ml__ | 100 |
| pH—10.9. | |

This lotion is applied at the rate of 10 to 15 ml. per application to the hair.

Treatment carried out for 15 days and repeated every three weeks substantially reduces scaling, even in especially difficult cases.

EXAMPLE 4

A cosmetic composition in the form of a gel for use in combatting scale formation on the scalp and holding the hair in place is produced by preparing the following mixture:

| | G. |
|---|---|
| L-arginine citrate _____ | 1.5 |
| Carboxypolymethylene sold under the trademark "Carbopol 940" _____ | 0.5 |
| Polyvinylpyrrolidone K30 (MW 40,000) _____ | 1 |
| Propylene glycol _____ | 10 |
| Perfume _____ | 0.2 |
| Ethanol _____ | 40 |
| Methyl p-hydroxybenzoate sold under the trademark "Nipagin M" _____ | 0.1 |
| Water (q.s.p.) 100 ml. | |
| pH—8.5. | |

This gel applied to the hair every morning keeps the hairdo in shape and the formation of scales is essentially eliminated.

EXAMPLE 5

A lotion for use in the present invention is prepared by mixing together:

| | |
|---|---|
| Arginine nicotinate _____ g__ | 1.5 |
| Prefumed distilled water (q.s.p.) _____ml__ | 100 |
| pH—7. | |

This lotion is applied at the rate of 10 to 15 ml. per application to the hair.

When the hair is treated with this lotion for 15 days and the treatment is repeated every three weeks, scaling of the scalp is substantially reduced.

EXAMPLE 6

The appearance of scales on the scalp can be combatted by massaging it daily with a gel having the following composition:

| | G. |
|---|---|
| Carboxypolymethylene, sold under the trademark "Carbopol 940" _____ | 30 |
| 3% gum tragacanth _____ | 30 |
| Methyl p-hydroxybenzoate, sold under the trademark "Nipagin M" _____ | 0.1 |
| Perfume _____ | 0.2 |
| L-histidine _____ | 0.5 |
| Arginine _____ | 2 |
| Water (q.s.p.) _____ | 100 |
| pH—8.5. | |

EXAMPLE 7

A gel for holding the hair in place which also combats the appearance of scales on the scalp is applied to the scalp in the manner outlined in Example 6 and has the following composition:

| | G. |
|---|---|
| L-arginine citrate | 2 |
| Carboxypolymethylene sold under the trademark "Carbopol 940" | 0.5 |
| Polyvinylpyrrolidone K30 (MW 40,000) | 1 |
| Propylene glycol | 10 |
| Perfume | 0.2 |
| Ethanol | 40 |
| Methyl p-hydroxybenzoate, sold under the trademark "Nipagin M" | 0.1 |
| Water (q.s.p.)—100 ml. | |
| Arginine (q.s.p.)—pH 8.5. | |

EXAMPLE 8

An anionic anti-dandruff shampoo having a pH value of 8.5 and the following composition is prepared:

| | G. |
|---|---|
| Triethanolamine laurylsulfate | 5 |
| Lauryl diethanolamide | 3 |
| Hydroxypropylenethylcellulose | 0.25 |
| L-arginine malate | 2 |
| Methyl parahydroxybenzoate | 0.2 |
| L-arginine (q.s.p.) pH 8.5. | |
| Water (q.s.p.) | 100 |

The hair and scalp are shampooed weekly with the above composition and a rapid disappearance of scales on the scalp results.

EXAMPLE 9

An anionic anti-dandruff shampoo having a pH value of 7 and the following composition is prepared:

| | G. |
|---|---|
| Lauryl sulfate oxyethylenated with 12 moles ethylene oxide | 5 |
| Polyethylene glycol distearate | 2 |
| Lauryl diethanolamide | 3 |
| Arginine citrate | 4 |
| Methyl parahydroxybenzoate | 0.2 |
| Water (q.s.p.) | 100 |

This shampoo is employed as in Example 8 with equally favorable results.

EXAMPLE 10

A non-ionic shampoo made in accordance with the present invention and having a pH of 8.5 is prepared by admixing:

| | G. |
|---|---|
| Compound responding to the formula: 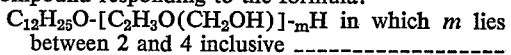 in which $m$ lies between 2 and 4 inclusive | 6 |
| Lauryl alcohol, oxyethylenated with 12 moles of ethylene oxide | 5 |
| Lauryl diethanolamide | 2 |
| Arginine nicotinate | 2 |
| Water (q.s.p.) | 100 |
| L-arginine (q.s.p.) pH 8.5. | |

This shampoo composition is used in the manner described in Example 8 with comparably favorable results.

EXAMPLE 11

A hair setting lotion in accordance with this invention and having the following composition is prepared as follows:

| | G. |
|---|---|
| L-arginine citrate | 3 |
| Dimethylhydantoin formaldehyde resin (water-soluble, practically odorless, softens at 59–80° C.) | 0.1 |
| Ethanol | 62 |
| Water (q.s.p.) | 100 |
| L-arginine (q.s.p.) pH 8.5. | |

When the hair and scalp are treated with the above lotion in the manner set out in Example 5, equally favorable results are achieved.

EXAMPLE 12

A hair lotion which can be used for friction-shampooing has the following composition:

| | G. |
|---|---|
| L-arginine malate | 2 |
| Oleyl alcohol | 0.2 |
| Lauroylcycloimidinium-1 ethoxyethionic acid-2 ethionic acid, disodium salt, sold under the trademark "Miranol" $C_2M$ conc. | 3.5 |
| Perfume | 0.2 |
| Isopropanol | 46 |
| Water (q.s.p.) | 100 |
| L-arginine (q.s.p.) pH 8.5. | |

This hair lotion is applied to the hair and scalp at a rate of about 10–15 ml. per application and scaling of the scalp is significantly reduced.

EXAMPLE 13

A capillary lotion which is used in the manner essentially as outlined in Example 5, is prepared by mixing the following ingredients:

| | G. |
|---|---|
| L-histidine | 1 |
| L-arginine malate | 2 |
| Perfume | 0.2 |
| Hexylene glycol | 0.4 |
| Methyl parahydroxybenzoate sold under the trademark "Nipagin M" | 0.2 |
| 50% aqueous solution of isopropyl alcohol (q.s.p.) —100 ml. | |

The pH of this composition is about 7.3.

EXAMPLE 14

An anionic shampoo is prepared by mixing the following ingredients:

| | G. |
|---|---|
| L-histidine | 2 |
| Lysine citrate | 2 |
| Triethanolamine lauryl sulfate | 5 |
| Undecylenic diethanolamide | 1 |
| Hydroxypropylenethylcellulose | 0.25 |
| n-Propyl parahydroxybenzoate, sold under the trademark "Nipasol" | 0.2 |
| Water (q.s.p.)—100 ml. | |

The pH of this composition is about 7.5. When used as outlined above in Example 8, equally favorable results are achieved.

In the above compositions where the active ingredient is present in solution in a lower alkanol or an aqueous solution of a lower alkanol, the lower alkanol can have up to 4 or 5 carbon atoms, with the aqueous solutions thereof containing from about 10–70, preferably about 20–50 weight percent lower alkanol. Further, when polyvinylpyrrolidone is employed in admixture with the active ingredient, the polyvinylpyrrolidone can have a molecular weight ranging from about 10,000 to 700,000.

Further, the active ingredient or ingredients designated in essentially any of the above specific examples can be replaced by an equivalent amount of any of the other active ingredients disclosed herein or mixtures thereof.

What is claimed is:

1. A method for combatting scaling of the scalp comprising applying to the hair and scalp of one who suffers from a scaling scalp in amount effective to reduce said scaling a solution of a member selected from the group consisting of arginine, histidine, lysine, the citric, nicotinic and malic acid salts of said arginine, histidine and lysine and mixtures thereof in a solvent therefor, said solvent being selected from the group consisting of water and a hydroalcoholic solution containing about 10–70 weight percent of a lower alkanol selected from the group consisting of ethanol and isopropanol, said member being present in amounts ranging from about 0.2 to about 5 weight percent of said solution, and said solution having a pH ranging between about 7 to 11.0.

2. The method of claim 1 wherein said member is present in amounts of about 1–4 weight percent of said composition.

3. The method of claim 1 wherein said member is 1-arginine.

4. The method of claim 1 wherein said member is 1-arginine citrate.

5. The method of claim 1 wherein said member is arginine nicotinate.

6. The method of claim 1 wherein said member is 1-histidine.

7. The method of claim 1 wherein said member is 1-arginine malate.

8. The method of claim 1 wherein said solution also contains a perfume.

9. The method of claim 1 wherein said solution also contains a bactericidal agent.

10. The method of claim 1 wherein said solution also contains a penetrating agent.

11. The method of claim 1 wherein said solution also contains a brillantine.

12. The method of claim 1 wherein said solution also contains a detergent.

13. The method of claim 1 wherein said solution also contains a compound selected from the group consisting of carboxypolymethylene, hydroxylpropylene ethylcellulose and polyethyleneglycol distearate.

14. The method of claim 1 wherein said solution also contains a compound selected from the group consisting of hexyleneglycol and propyleneglycol.

References Cited
FOREIGN PATENTS

| | | | |
|---|---|---|---|
| 987,800 | 3/1965 | Great Britain | 424—70 |
| 720,561 | 12/1954 | Great Britain | 424—70 |
| 857,243 | 12/1960 | Great Britain | 424—319 |

OTHER REFERENCES

Cotter et al., American Perfumer & Cosmetics, vol. 82, No. 4, April 1967, pp. 47, 48, 50, 52, 55–58.

Riso, Soap & Chemical Specialties, May 1963, pp. 82–84, 151–153, 155, 157, 158.

Merck Index, 7th ed., 1960, pp. 98–99, 521, 623.

ALBERT T. MEYERS, Primary Examiner

N. A. DREZIN, Assistant Examiner

U.S. Cl. X.R.

424—273, 319

UNITED STATES PATENT OFFICE
CERTIFICATE OF CORRECTION

Patent No. 3,778,502          Dated December 11, 1973

Inventor(s) Guy Aubin and Georges Manoussos

It is certified that error appears in the above-identified patent and that said Letters Patent are hereby corrected as shown below:

In The Heading:

"54,253" should read --54,223--.

Signed and sealed this 10th day of September 1974.

(SEAL)
Attest:

McCOY M. GIBSON, JR.
Attesting Officer

C. MARSHALL DANN
Commissioner of Patents